Sept. 1, 1970  W. J. HORGAN, JR  3,526,389
BLOCK
Filed Sept. 6, 1968

INVENTOR.
William J. Horgan, Jr.
BY
Paul & Paul
ATTORNEYS.

United States Patent Office 3,526,389
Patented Sept. 1, 1970

3,526,389
BLOCK
William J. Horgan, Jr., Pittsburgh, Pa., assignor to Blumcraft of Pittsburgh, a firm composed of Hyman Blum, Louis Blum, Max Blum, and Harry P. Blum, Pittsburgh, Pa.
Filed Sept. 6, 1968, Ser. No. 758,066
Int. Cl. B66d 1/36
U.S. Cl. 254—195          5 Claims

ABSTRACT OF THE DISCLOSURE

A multi-position, multi-functional block. The block has a lightweight shell with a sheave mounted for rotation therein. The hanger connected to the shell is rotatable about the axis of its connecting support pin. The hanger has a base portion through which the connecting support pin passes, said base portion being hollow and cylindrical with its outwardly disposed end having a radially inwardly protruding shoulder thereon. The hanger has a swivel portion which is cylindrical and which has an outwardly protruding shoulder thereon at one end. The swivel portion is disposed for rotation in the cylindrical base portion and protrudes therefrom. The sides of the cylindrical swivel portion, and its outwardly disposed shoulder are in sliding contact respectively with the inner cylindrical sides of the inwardly protruding shoulder and the inner cylindrical walls of the base portion. These interlocking shoulders provide substantial and well-defined bearing surfaces.

The swivel portion has a plurality of holes therein perpendicular to the axis thereof; the holes being non-intersecting. The holes are preferably two in number, and are at right angles to one another. A shackle it attached to said swivel portion by passing a shackle pin through holes in the legs of the shackle and one of the holes in the swivel portion. Means are provided for retaining the shackle pin in the hole. The shackle is free to rotate about the axis of the shackle pin.

The ends of the legs of the shackle are rounded, and mate with complementary, rounded surfaces at the outwardly disposed end of the base portion of the hanger. This mating occurs when the shackle is mounted by passing the shackle pin through the hole in the swivel portion which is closest to the base portion. However, when the shackle pin is removed and the shackle is mounted to the swivel portion by passing the shackle pin through the second hole in the swivel portion, then the rounded ends of the legs of the shackle are not in engagement with the rounded surfaces on the base portion, and the result is that the swivel portion is free to rotate about its axis within the base portion.

BACKGROUND OF THE INVENTION

This invention relates to a block for use with the lines on a sailing vessel, and more particularly, to a block of the type described, which is small and lightweight and yet possesses great strength and flexibility insofar as the mounting means is concerned.

In the prior art, blocks have been disclosed which have provision for mounting the shackle in two positions at right angles to one another. Also, blocks have been disclosed which mount the shackle in swiveled engagement with the shell. No prior art device nor combination of devices known to me discloses means providing for all three mounting positions in the same block. The prior art devices which disclose a swivel between the shackle and the shell of a lightweight block, normally incorporated the swivel into the lightweight sheet metal shell, as for example the device shown in U.S. Pat. No. 2,517,249.

This provided a rather weak and unsatisfactory mounting means which was subject to binding and even separating under continued use at high loads.

SUMMARY OF THE INVENTION

The present invention covers a novel block of lightweight but strong construction and great flexibility in use. The invention comprises a lightweight shell supporting a sheave, and having connected thereto, a multi-position shackle or hook, capable of being placed in several fixed positions, or a swivel position, with respect to the shell by a simple manipulation which requires no additional parts. It is an object of this invention to provide a lightweight, strong, and versatile block. It is a further object of this invention to provide a swivel block with greatly increased strength and performance over blocks known in the prior art.

These and other objects of the invention will become apparent from the following disclosure with reference to the drawings.

DESCRIPTION OF THE PREFERRED EMBODIMENTS

Figure 1:
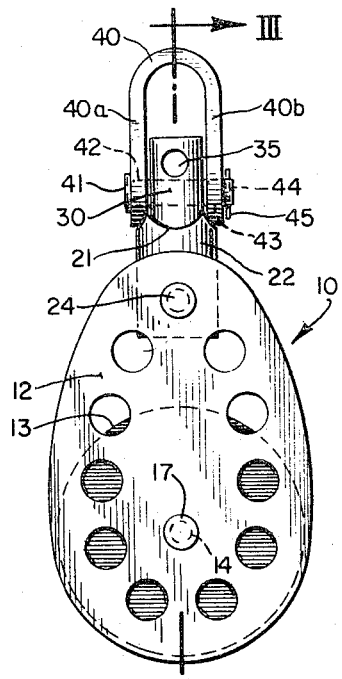
FIG. 1 is a front view of a block in accordance with the preferred embodiment of this invention.

Although specific forms of the invention have been selected for illustration in the drawings, and the following description is drawn in specific terms for the purpose of describing these forms of the invention, this description is not intended to limit the scope of the invention which is defined in the appended claims.

Figure 3:
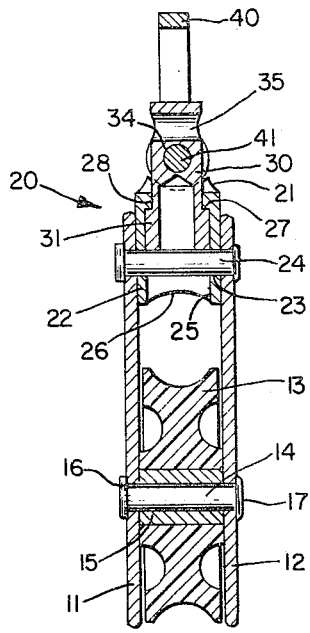
FIG. 3 is a view taken as indicated by the lines and arrows III—III of FIG. 1.
Figure 2:
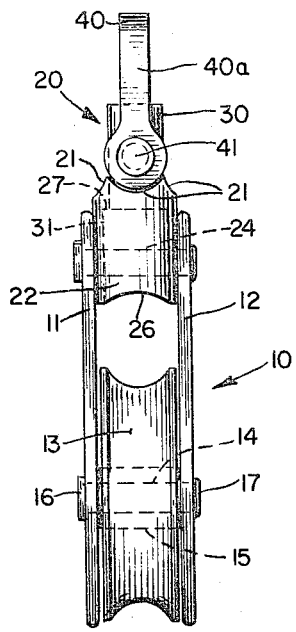
FIG. 2 is a side view of the block shown in FIG. 1.
Figure 6:
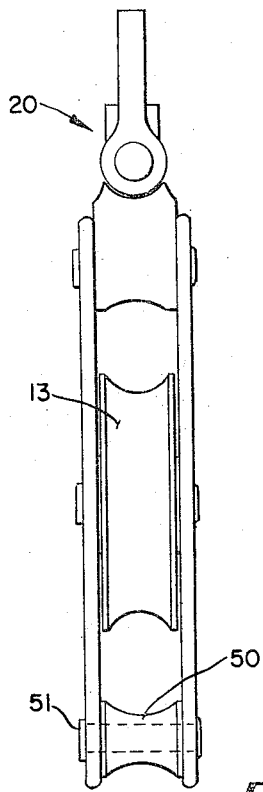
FIG. 6 is a side view similar to that shown in FIG. 2 showing an alternate embodiment of the block.

Referring to FIGS. 1, 2, and 3, a block in accordance with the preferred embodiment of my invention, is shown. The block comprises a shell or frame 10 made up of side walls 11 and 12. Each side wall is made of a tough, hard material and has a plurality of holes therein which reduce the weight of the block without sacrificing strength. Disposed between the side walls is a sheave 13 preferably made of a lightweight, plastic material such as nylon, which is mounted for rotation, about a sheave pin 14, which passes through the hub and bearing 15, and is rolled or otherwise secured at the ends to the side walls, as at 16 and 17.

A hanger means, generally designated 20, comprising a base member 22, and a swivel member 30, is attached to the shell 10 at a distance sufficiently removed from the sheave 13, so that a rope or line can pass between the base member 22 and the sheave 13. Normally, this distance is at least as great as the distance between the side walls of the sheave. The base member 22 is preferably a cylindrical body made of stainless steel, and has a hole 23 therein, through which passes a mounting pin 24 which is secured at either end, in any suitable fashion, so as to retain the base member between the side walls of the sheave. The hole 23 is a clearance hole for the pin 24 so that the base member can rotate freely about the axis of the pin 24. The lower end of the base member 22, which is in closest proximity to the sheave 13, is preferably relieved on either side as shown by the curved, cut-out 26, so as to provide for easy passage of a rope or line through the space between the lower end and the sheave 13.

The upper end of the base member has a radially inwardly protruding shoulder 27 which terminates in a bore 28 which is coaxial with the bore 25 of the base member 22. This shoulder and the inner bore of the base member 22 are designed for a close, sliding fit with the swivel member 30, as will be more fully described.

The swivel member is a cylindrical member, preferably made of stainless steel, and having an outwardly disposed cylindrical shoulder 31, at one end thereof. The surfaces of the shoulder are machined closely to fit in a snug, sliding fit with the previously described surfaces of the shoulder and bore of the base member 22. In addition, the cylindrical shoulder extends downwardly, to provide a substantial bearing surface, and to help prevent cocking of the swivel member 30 in the base member 22.

In the body of the swivel member 30, there are a plurality of holes which are preferably bored perpendicular to the axis of the swivel member 30. The holes 34 and 35 are spaced along the axis of the swivel member 30 so that they do not intersect with one another.

In the embodiment shown in FIGS. 1, 2, and 3, the shackle 40 is connected to the hanger means by means of a shackle pin 41 which passes through holes 42 and 43 in the legs 40a and 40b respectively of the shackle and through hole 34 of the swivel portion of the hanger means. The shackle pin 41 has a head at one end and a small hole 44 in the other end thereof through which is inserted a spring pin 45 or other suitable means to retain the shackle pin in position. The spring pin 45 can be removed from the hole 44 by hand so as to permit removal of the shackle pin 41.

Figure 4:
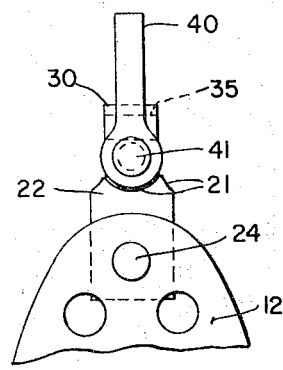
FIG. 4 is a partial plan view of the block shown in FIG. 1, showing the shackle in alternate, fixed position.

The ends of the legs 40a and 40b of the shackle 40 are rounded. The upper end of the base member 22 of the hanger means 20 has rounded cut-outs as at 21, to accommodate and mate with the rounded portions of the legs 40a and 40b when the shackle is pinned to the swivel member as in FIGS. 1, 2, and 3. Two sets of rounded cut-outs are provided in the upper end of the base portion 22, at right angles to one another, thereby providing means to accommodate several positions of the shackle. When it is desired to place the shackle in a position which is 90 degrees to the position shown in FIGS. 1, 2, and 3, the spring pin 45 is removed from the hole 44, and the shackle pin 41 is withdrawn from holes 43, 34, and 42. The shackle is then removed from engagement with the cut-outs 21. The swivel portion is then free to rotate about its axis. Accordingly, the swivel portion is rotated 90 degrees so that it assumes the position shown in FIG. 4. In that position, the holes in the legs of the shackle are placed in alignment with hole 34 so that the rounded portions of the shackle legs are now in sliding engagement with the cut-outs 21 on the base member 22. Then the shackle pin 41 is inserted into hole 42, through hole 34, and hole 43, and the spring pin 45 is once again inserted through the hole 44, to retain the shackle pin. It will be observed that the shackle is still free to rotate about the pin 41. However, it is now in an alternate fixed position relative to the block itself; which position is 90 degrees from the previous, fixed position.

Figure 5:
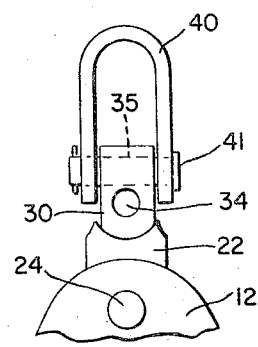
FIG. 5 is a partial sectional view similar to that shown in FIG. 3 with the shackle in a further alternate position.

The shackle can be repositioned on the swivel member 30 so that the swivel member freely rotates about its axis in the base member 22. To reposition the shackle 40, the spring pin 45 and the shackle pin 41 are removed, as previously described, and the holes 42 and 43 are placed in axial alignment with the hole 35 in the swivel member 30. The shackle pin 41 and the spring pin 45 are then replaced. It will be observed, as more clearly shown in FIG. 5, that the rounded ends of the legs 40a and 40b of the shackle 40 are now clear of interference with the upper end of the base member 22, so that the swivel member is free to rotate. Furthermore, the swivel member will not descend within the base member so as to bring the ends of the legs into engagement with the base member since the end of the swivel member is tangent to the surface of the pin 24.

The bearing surfaces on the base member and the swivel member coact to prevent binding of the swivel member in the base member and to greatly increase the pull-out strength of the unit as a whole.

In a further embodiment of this invention, an auxiliary sheave is provided in the block. The auxiliary sheave 50 is mounted on shaft 51, which passes through the side walls of the shell and is affixed thereto in any conventional manner. This auxiliary sheave provides even greater versatility to the subject invention.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the U.S. Patent Office, and is not intended to limit the scope of the invention described and claimed herein.

What is claimed is:

1. In a block having a shell and a sheave supported in said shell, the improvement comprising:
   hanger means connected to said shell;
   shackle means connected to said hanger means;
   said hanger means comprising swivel means having a plurality of holes therein, for accommodating said shackle means in a plurality of fixed positions, and base means connected to said shell, and supporting said swivel means, said base means being provided with concave surfaces coacting with said shackle means, to maintain said shackle means in said plurality of predetermined fixed positions and coacting with said swivel means, to permit said swivel means to freely rotate when said shackle is disposed on said swivel means in a further predetermined position.

2. The invention of claim 1 wherein said base means has a longitudinal bore therein terminating in a radially inwardly protruding shoulder, and said swivel means comprises a substantially cylindrical member terminating in a radially outwardly protruding shoulder, said base member and said swivel member being in sliding engagement along the surfaces adjacent to said shoulders whereby means are provided to retain said swivel means in said base means for rotation therein.

3. The invention of claim 2 wherein said shackle means comprises a shackle having at least one leg, which leg is pivotally connected to said swivel means and terminates in a rounded surface; and said base means has a complementary rounded cut-out to accommodate said rounded surface of said leg, said base means having at least one of said cut-outs for each of said plurality of fixed positions of said shackle means.

4. The invention of claim 3 wherein the plurality of holes in said swivel means are disposed substantially perpendicular to the axis of the cylindrical, swivel member and are non-intersecting.

5. The invention of claim 1 wherein an additional sheave is provided, connected to said shell.

References Cited

UNITED STATES PATENTS

| | | | |
|---|---|---|---|
| 691,492 | 1/1902 | Roney | 254—195 |
| 2,071,578 | 2/1938 | Roach | 254—195 |

HARVEY C. HORNSBY, Primary Examiner